(12) United States Patent
Denis et al.

(10) Patent No.: US 11,007,685 B1
(45) Date of Patent: May 18, 2021

(54) FABRICATING ULTRA-THIN STRUCTURED POLYMER FILMS

(71) Applicant: United States of America as represented by the Administrator of NASA, Washington, DC (US)

(72) Inventors: Kevin L. Denis, Crofton, MD (US); Edward J. Wollack, Clarksville, MD (US); Adrian N. Daw, Greenbelt, MD (US); Douglas M. Rabin, Arnold, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 316 days.

(21) Appl. No.: 16/142,220

(22) Filed: Sep. 26, 2018

(51) Int. Cl.
| | | |
|---|---|---|
| *B29C 41/38* | (2006.01) | |
| *B29C 41/12* | (2006.01) | |
| *B29C 41/46* | (2006.01) | |
| *B29C 41/42* | (2006.01) | |
| *B29K 23/00* | (2006.01) | |
| *B29K 105/00* | (2006.01) | |

(52) U.S. Cl.
CPC ............ *B29C 41/38* (2013.01); *B29C 41/12* (2013.01); *B29C 41/42* (2013.01); *B29C 41/46* (2013.01); *B29K 2023/38* (2013.01); *B29K 2105/0085* (2013.01); *B29K 2907/00* (2013.01)

(58) Field of Classification Search
CPC ........ B29C 41/12; B29C 41/38; B29C 41/42; B29C 41/46
See application file for complete search history.

(56) References Cited

U.S. PATENT DOCUMENTS

| | | | | |
|---|---|---|---|---|
| 4,476,172 A | * | 10/1984 | Ward | G03F 1/62 428/38 |
| 4,796,973 A | * | 1/1989 | Gordon | B29C 41/12 359/350 |
| 4,857,373 A | * | 8/1989 | Carcia | G11B 7/243 428/64.6 |
| 4,979,888 A | * | 12/1990 | Bauer | B29C 33/06 264/126 |
| 5,261,977 A | * | 11/1993 | Powell | B01D 69/122 156/150 |
| 5,965,065 A | * | 10/1999 | Powell | G21K 1/06 252/478 |
| 9,889,504 B2 | * | 2/2018 | Weiss | B22F 9/04 |
| 10,042,091 B2 | * | 8/2018 | Kildishev | G02B 6/1226 |
| 10,369,725 B2 | * | 8/2019 | Choi | B29C 41/12 |

OTHER PUBLICATIONS

Wollack, E.J., Denis, K.L., Barlis, A., Chang, M.-P., Kutyrev, A.S., Miller, K.H., Nagler, P.C., "Far Infrared Properties of Cyclic Olefin Copolymer" Optics Letters (2019).

* cited by examiner

*Primary Examiner* — Atul P. Khare
(74) *Attorney, Agent, or Firm* — Christopher O. Edwards; Bryan A. Geurts; Helen M. Galus

(57) ABSTRACT

Processes for fabricating structured, relatively large area, ultra-thin polymer films are disclosed. For instance, such a process may include spinning a thermoplastic polymer film onto an etched wafer that serves as a mold for the thermoplastic polymer film, baking the thermoplastic polymer film on a hotplate at a curing temperature, delaminating the thermoplastic polymer film in water, and peeling the thermoplastic polymer film from the etched wafer, producing a structured thermoplastic polymer film that has structures corresponding to areas where the wafer has been etched.

20 Claims, 7 Drawing Sheets

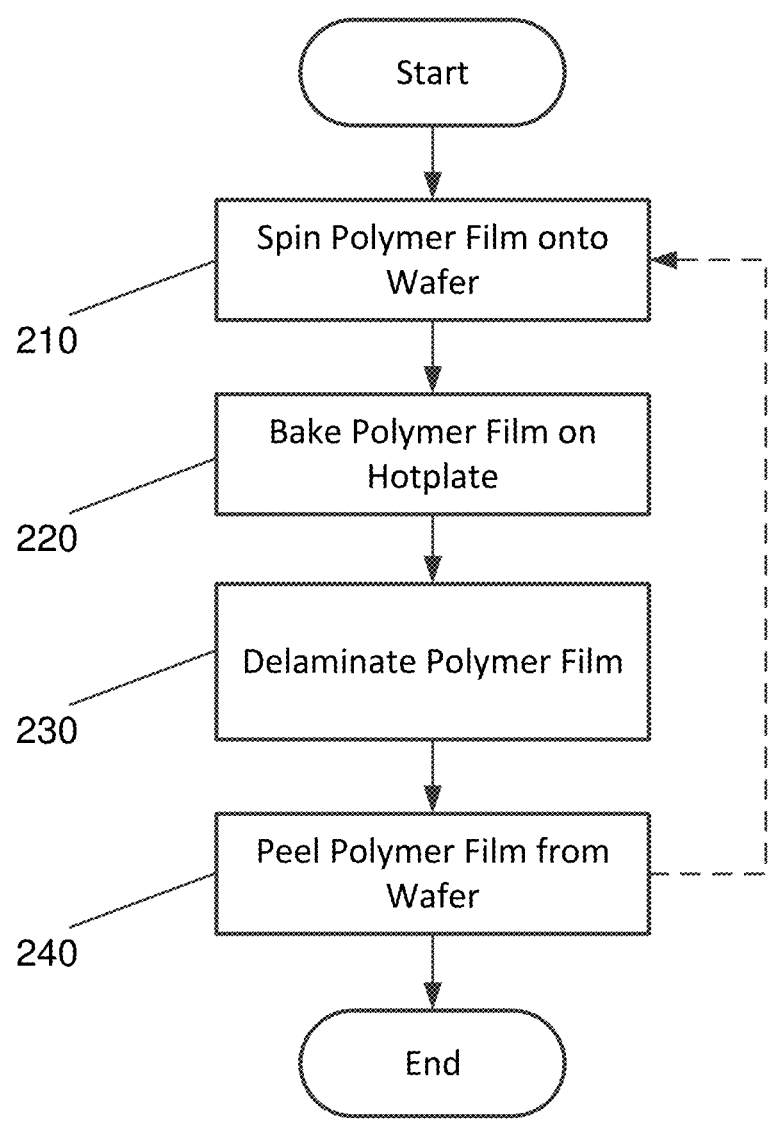

FIG. 3
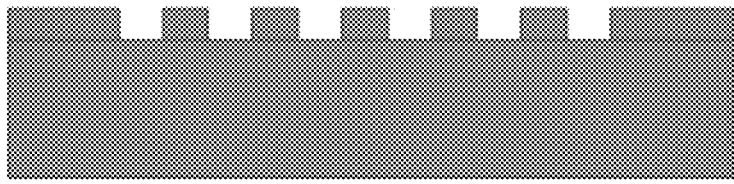
A — 310
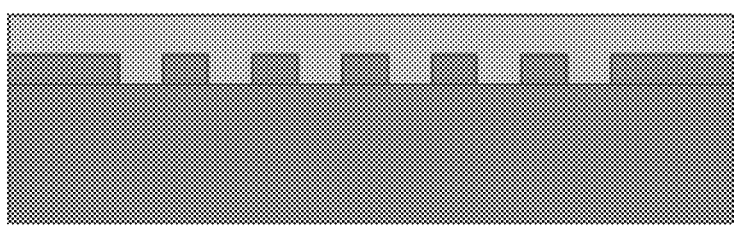
B — 320, 310
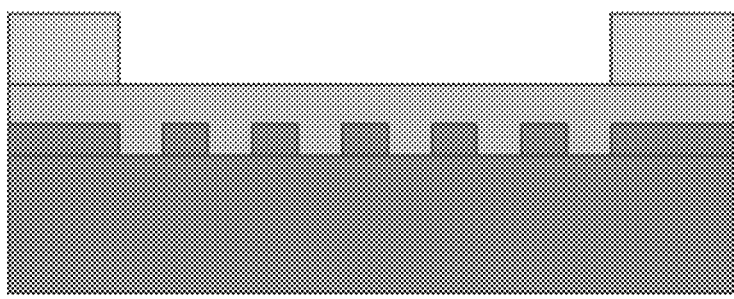
C — 330, 320, 310
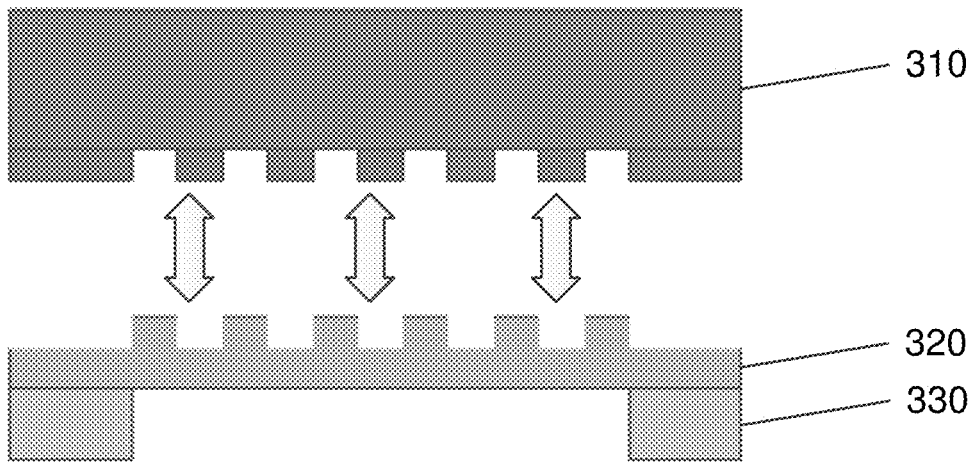
D — 310, 320, 330

FIG. 5
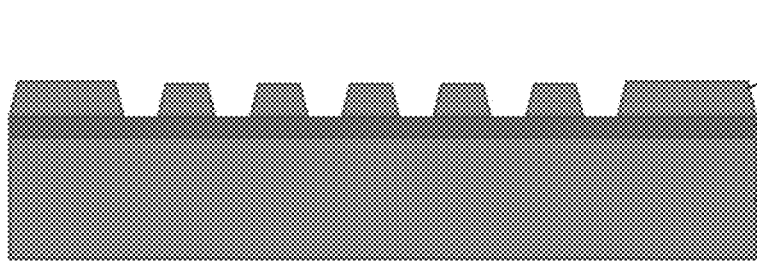
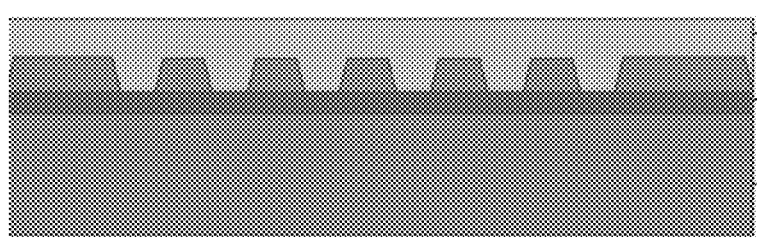
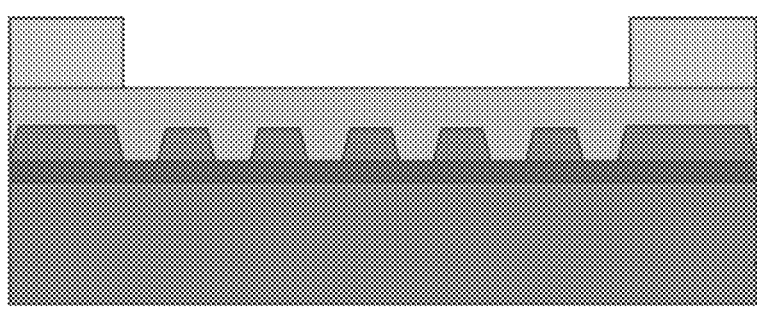
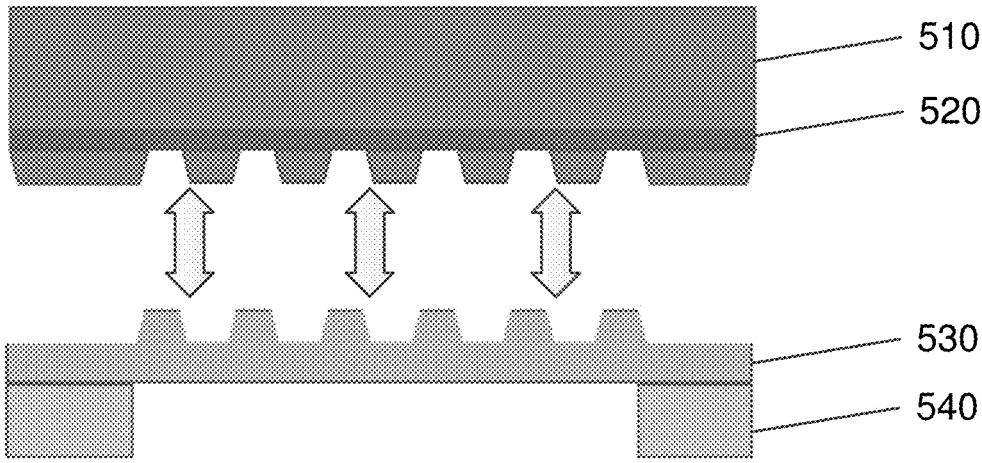

FABRICATING ULTRA-THIN STRUCTURED POLYMER FILMS

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to polymer films, and more specifically, to processes for fabricating ultra-thin, highly uniform, structured polymer films that readily produce relatively large area films.

BACKGROUND

Fabrication of polymer-based optical devices requires low loss materials with high strength and exceptional thickness uniformity over large areas. To reduce loss in applications ranging from x-ray to ultraviolet (UV) optics, very thin materials are required. At long wavelength ranges, absence of an absorption band in the spectrum of interest is desirable. Methods for incorporating topography into the films further enhance their utilization.

Conventionally, ultra-thin thermoplastic polymer films are molded by thermo-stamping, nano imprinting, and thermoforming. In the film fabrication processes, a stamp is applied to the film at a temperature above the glass transition temperature, causing the material to flow to form the structure of the stamp. Highly parallel stamping processes and uniform temperature control are required to maintain a uniform height across large areas. Other processes used to form topography on a polymer film include photolithography and etch back. However, this is limited by etching uniformity, which can vary significantly across a wafer and is detrimental in UV applications, for instance. Additionally, photolithography processes are relatively expensive. Accordingly, an improved process for producing ultra-thin, highly uniform, structured polymer films may be beneficial.

SUMMARY

Certain embodiments of the present invention may provide solutions to the problems and needs in the art that have not yet been fully identified, appreciated, or solved by conventional processes for creating polymer films. For example, some embodiments pertain to processes for fabricating structured, relatively large area, ultra-thin polymer films.

In an embodiment, a method includes spinning a thermoplastic polymer film onto an etched wafer. The etched wafer serves as a mold for the thermoplastic polymer film. The method also includes baking the thermoplastic polymer film on a hotplate at a curing temperature. The curing temperature is adjusted to dry a solvent and to allow the thermoplastic polymer film to flow on the etched wafer, fill areas of the wafer that were etched, and partially planarize a thickness of the thermoplastic polymer film. The method further includes delaminating the thermoplastic polymer film in water and peeling the thermoplastic polymer film from the etched wafer, producing a structured thermoplastic polymer film that has structures corresponding to areas where the wafer has been etched.

In another embodiment, a method includes spinning a cyclic olefin copolymer (COC) film onto a wafer that has been etched. The wafer serves as a mold for the COC film. The method also includes baking the COC film on a hotplate at a curing temperature. The curing temperature is adjusted to dry a solvent and to allow the COC film to flow on the wafer, fill etched areas of the wafer, and partially planarize a thickness of the COC film. The method further includes delaminating the COC film in water and peeling the COC film from the wafer, producing a structured COC film that has structures corresponding to areas where the wafer has been etched. Additionally, the method includes reusing the wafer to produce another structured COC film.

In yet another embodiment, a method includes spinning a polymer film onto a wafer that has been etched. The wafer serves as a mold for the polymer film. The method also includes baking the polymer film on a hotplate at a curing temperature. The curing temperature is adjusted to allow the polymer film to flow on the wafer, fill areas of the wafer that were etched, and partially planarize a thickness of the polymer film.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 is a flowchart illustrating a process for fabricating structured, relatively large area, ultra-thin polymer membranes, according to an embodiment of the present invention.

FIG. 3 illustrates a process for producing an ultra-thin structured polymer film, according to an embodiment of the present invention.

FIG. 5 illustrates yet another process for producing an ultra-thin structured polymer film, according to an embodiment of the present invention.

DETAILED DESCRIPTION OF THE EMBODIMENTS

Figure 1A:
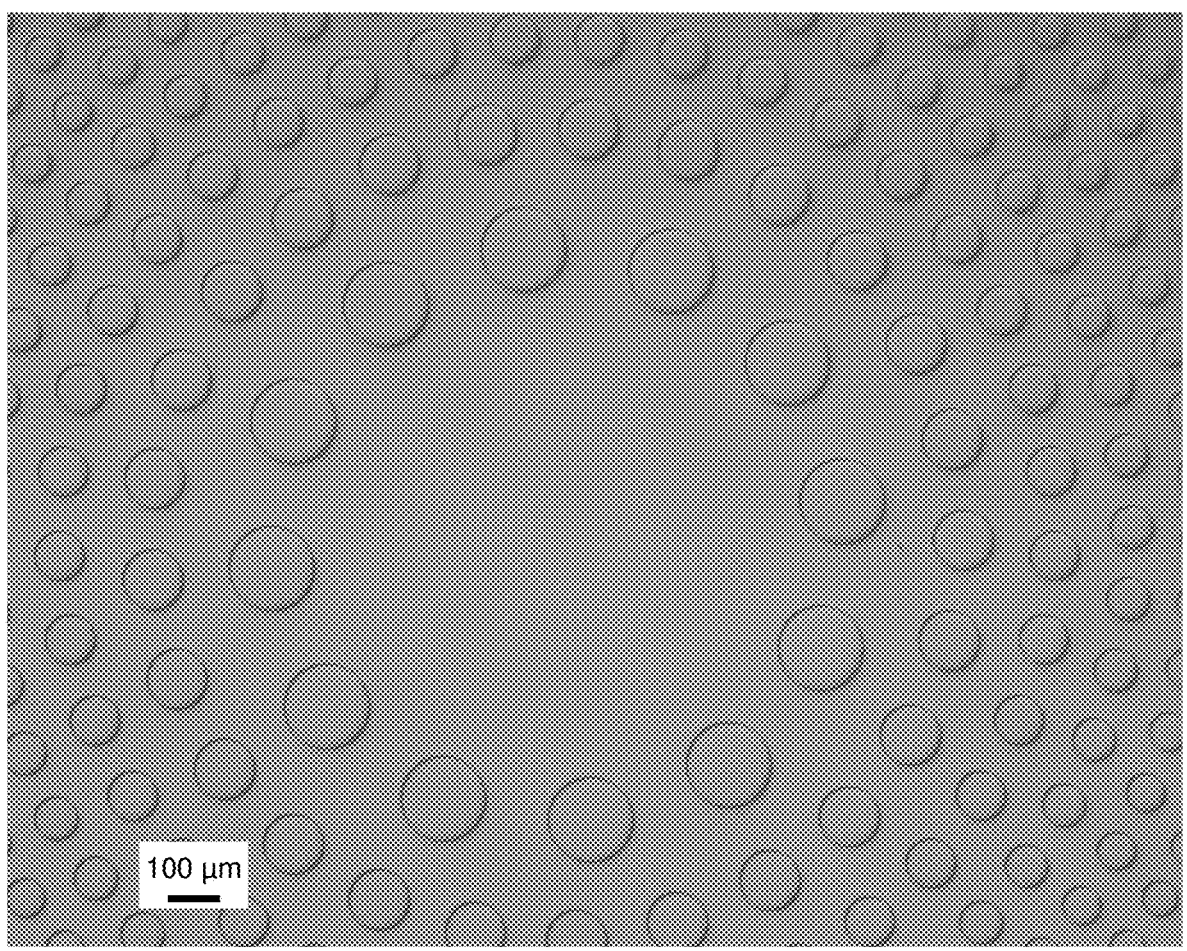
FIG. 1A is a magnified image illustrating a polymer phase contrast photon sieve, according to an embodiment of the present invention.

Some embodiments pertain to processes for fabricating structured (i.e., with topography), relatively large area, ultra-thin polymer films (e.g., membranes). In some embodiments, the polymer films may be used for optical applications ranging from the x-ray to submillimeter wavelength range. Whereas conventional techniques may yield a film that is approximately 1 inch wide and 80 nm thick, a prototype structured polymer film membrane produced from the process of one embodiment was approximately 170 mm in diameter and 300 nm thick. Another prototype film is 90 nm thick and one inch in diameter. However, it is envisioned that larger areas and thinner films may be produced.

The fabrication process of some embodiments begins with a silicon wafer that is patterned with photolithography and etched using deep reactive ion etching. A cryogenic etching process may be preferred in some embodiments to reduce sidewall roughening. After the photoresist is removed, the silicon is cleaned and rendered hydrophobic through standard microfabrication processes. This yields an etched silicon wafer that can be reused.

Next, the film (e.g., a film of materials such as cyclic olefin copolymers COC—also known by the trade name TOPAS™) is spun on the etched wafer. The spinning may be performed by spinning equipment, such as that produced by Headway Research, Inc.™ During the spinning process, the film is placed on the wafer (e.g., 5 ml of film solution) and the wafer is then spun at a high rate of speed (e.g., a few thousand rotations-per-minute (RPMs)). The film thickness can be controlled by varying the solution viscosity and/or the spin speed.

COC films have high transparency, minimal absorption bands in the far-infrared (IR) spectrum, exceptional mechanical strength, low moisture absorption, and compatibility with standard microfabrication process chemicals. Cyclic olefin copolymers are produced by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethene. Few conventional processes currently use COC films.

The etched silicon wafer acts as a mold for the film. The film is then baked on a hotplate. For instance, in some embodiments, the curing temperature is adjusted to dry the solvent at less than 200° C. In some embodiments, the solvent is sec-butylbenzene, toluene, or hexane. However, any suitable solvent or combination of solvents may be used without deviating from the scope of the invention.

Since films such as COC are thermoplastic, they will reflow during the curing process, fill the areas that were etched in the silicon wafer, and partially planarize the thickness of the film. If the spun-on film is not thick enough, the air/film surface will not be planar. In other words, there will be bumps following the mold topography. In the embodiments described herein, the film will be thick enough that the air/film surface will be less bumpy than the mold surface since the polymer can re-flow to reduce topography.

The film is then removed from the silicon wafer. More specifically, the film sticks to the silicon of the wafer, but peels off in water (delaminates). The delamination process in some embodiments includes spinning and baking the film on the silicon wafer and then attaching a temporary plastic frame to the film on the wafer. On the outside of the frame, the film is cut to allow water to penetrate between the film and the silicon. Since the film (e.g., COC) and the silicon are hydrophobic, when the water penetrates between the two surfaces, the film readily peels off. The frame keeps the thin film from folding onto itself.

Applying this process results in thin film that will have "bumps" or "steps" in areas where the silicon wafer has been etched. If the silicon etching process is modified to allow for sloped sidewalls, either through grayscale lithography, tuning the $O_2/SF_6$ chemistry in etching, or by another mechanism, the polymer film shape will result in the same topography. For the etched structures, the silicon mold can be etched so that a sloped or rounded topography can be used, then the bumps in the polymer will have a sloped edge (i.e., sloped sidewalls).

Instead of etching the silicon wafer, which is only as uniform as the etching process allows, a silicon wafer with an etch stop layer (e.g. a silicon-on-insulator (SOI)) wafer) may be used. A SOI wafer includes a silicon thin film on a thin $SiO_2$ layer coated on a silicon wafer. The $SiO_2$ layer forms an etch stop for the mold etching process.

Improvement in uniformity, particularly for UV and extreme UV (EUV) applications in some embodiments, could be realized by utilizing a SOI starting wafer such as that described above, where the silicon acts as the mold material. To make a phase contrast mask, the wafer is etched to a quarter of the wavelength of the light. In some embodiments, a SOI wafer can be purchased, trenches can be etched, the polymer film can be spun onto the wafer, and the film can then be delaminated. This provides a highly accurate topography on the polymer over large areas.

SOI wafers can be purchased with very high accuracy silicon layer thickness that is uniform to tens of nanometers over 200 mm and larger diameter wafers. This wafer can be used as a mold allowing highly accurate topography of the spun-on polymer. The silicon layer thickness determines the topography height and is well controlled since the buried oxide of the SOI wafer acts as an excellent etch stop for the silicon etch. The thickness uniformity of a spun polymer can be held to a few percent over large areas.

Figure 1B:
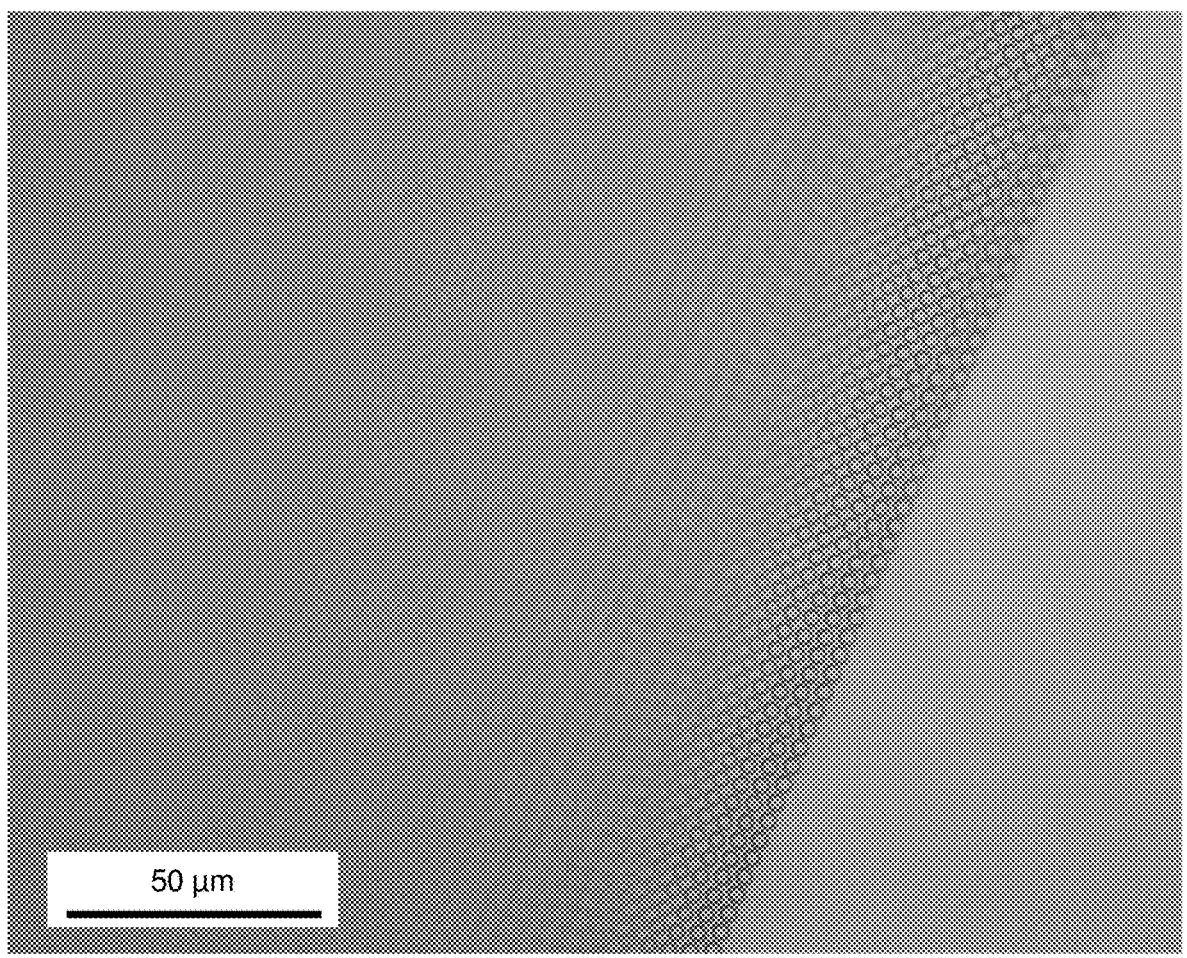
FIG. 1B is a further magnified image illustrating the polymer phase contrast photon sieve, according to an embodiment of the present invention.
Figure 1C:
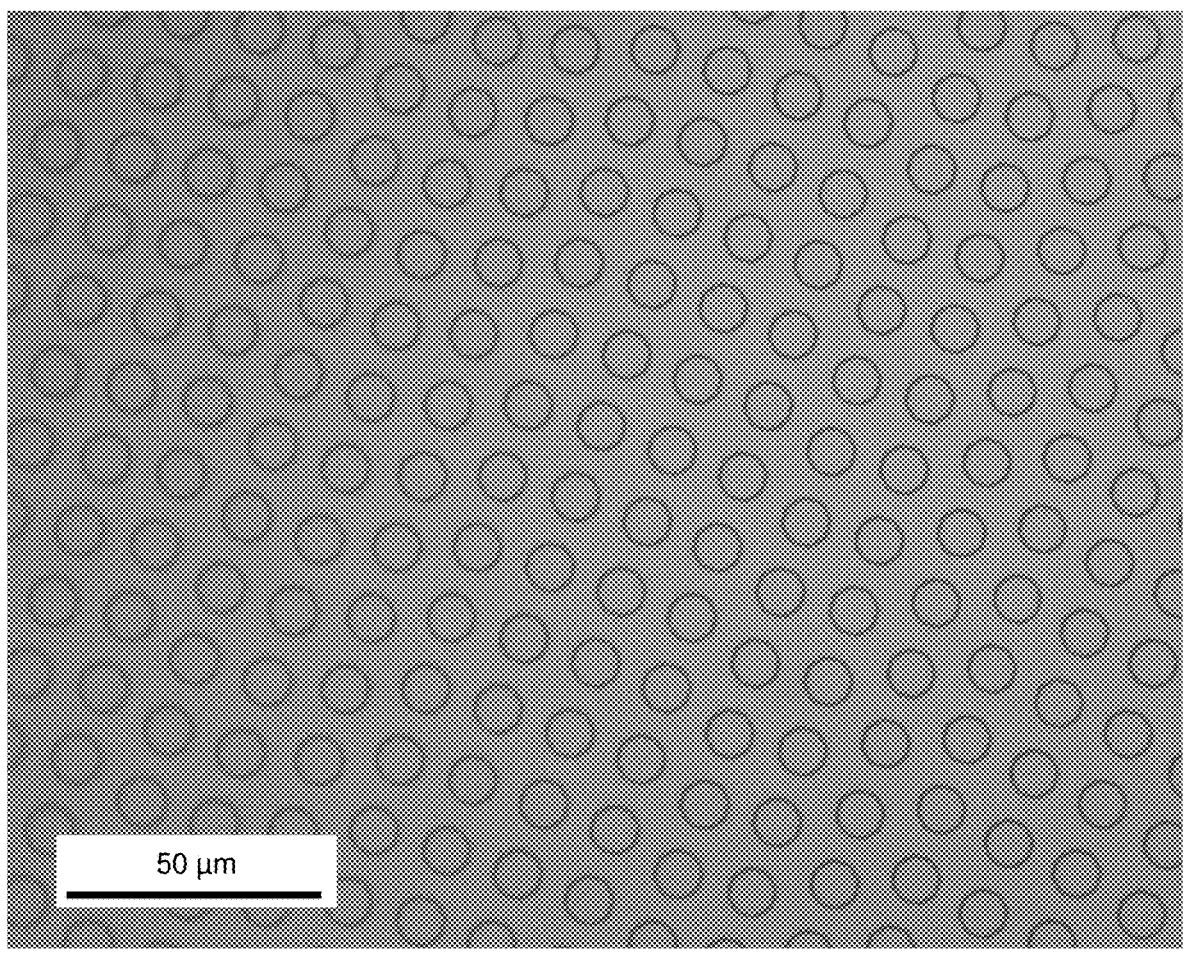
FIG. 1C is another further magnified image illustrating the polymer phase contrast photon sieve, according to an embodiment of the present invention.

For an EUV application where the added film thicknesses cause a phase shift, the highly uniform SOI layer enables exceptionally good control of performance. As an example application, a prototype phase contrast photon sieve has been built using this process. See images 100, 110, 120 of FIGS. 1A-1C. In FIG. 1A a 1 µm thick polymer photon sieve is shown. Center bumps are 800 µm in diameter and 0.3 µm tall. In FIG. 1B, outer zones of the photon sieve bumps are 2 µm in diameter and 0.3 µm tall. In FIG. 1C, the other portion of the photon sieve bumps are 10 µm in diameter and 0.3 µm tall. As opposed to a binary photon sieve, a phase contrast sieve enables increased throughput and higher efficiency.

Previous work on phase contrast sieves have used Kapton and polyimide sheets. However, these materials have lower transparency in the UV range and are difficult to texture. The silicon master of some embodiments consists of a wafer that has been etched with millions of circles to a depth of approximately 0.4 µm. The minimum feature size of an embodiment was 2 µm diameter holes with 2 µm spaces coated with a 1 µm thick COC film, which was subsequently removed.

For longer wavelength applications, it should be noted that larger structures and thicker films are required. For instance, in the far infrared spectrum, 10 µm tall bumps on a 10 µm pitch could be used to create an antireflection coating. Other applications include improved performance absorbers, which could be achieved by etching silicon structures with a slope such that the resulting films have a cone or other shape, which are then transferred to the film. These films could be coated with a highly absorbing layer, such as bismuth, gold black, carbon nanotubes, etc., to create an absorber. Very large area deployable optical structures, such as visible light photon sieves, are possible using this technique. Still other applications include an infrared blocking filter for soft x-ray detector applications. A freestanding 90 nm thick film 15 mm in diameter with 50 nm of aluminum has been created, which could be used for such a filter.

Because no sacrificial layer is required in some embodiments, trenches or other etched features can be added into the wafer such that it acts like a mold and can be used for UV applications (e.g., a UV lens) or for IR applications (e.g., for an anti-reflection coating where the index of refraction of the film is tuned on one side). Also, whereas conventional stamping processes (i.e., stamp the film with a mold, heat the film, and cause it to reflow), a highly accurate flat stamp is required for a large area, which is prohibitively difficult and expensive. Photolithography can also be used, but this requires a polymer and then etching, which is more expensive. The process of some embodiments is simpler and lower cost. Furthermore, the wafer of some embodiments is reusable.

FIG. 2 is a flowchart illustrating a process 200 for fabricating structured, relatively large area, ultra-thin polymer membranes, according to an embodiment of the present invention. The process begins with spinning a thermoplastic polymer film onto an etched wafer at 210. The etched wafer serves as a mold for the thermoplastic polymer film. The thermoplastic polymer film is then baked on a hotplate at a curing temperature at 220. The curing temperature is adjusted to dry a solvent and to allow the thermoplastic polymer film to flow on the etched wafer, fill areas of the etched wafer that were etched, and partially planarize a thickness of the thermoplastic polymer film.

After baking, the thermoplastic polymer film is delaminated in water at 230, allowing water to penetrate between the film and the etched wafer. The thermoplastic polymer film is then peeled from the etched wafer at 240, producing a structured thermoplastic polymer film that has structures corresponding to areas where the wafer has been etched. The process may then optionally be repeated to produce another structured thermoplastic polymer film.

Figure 4:
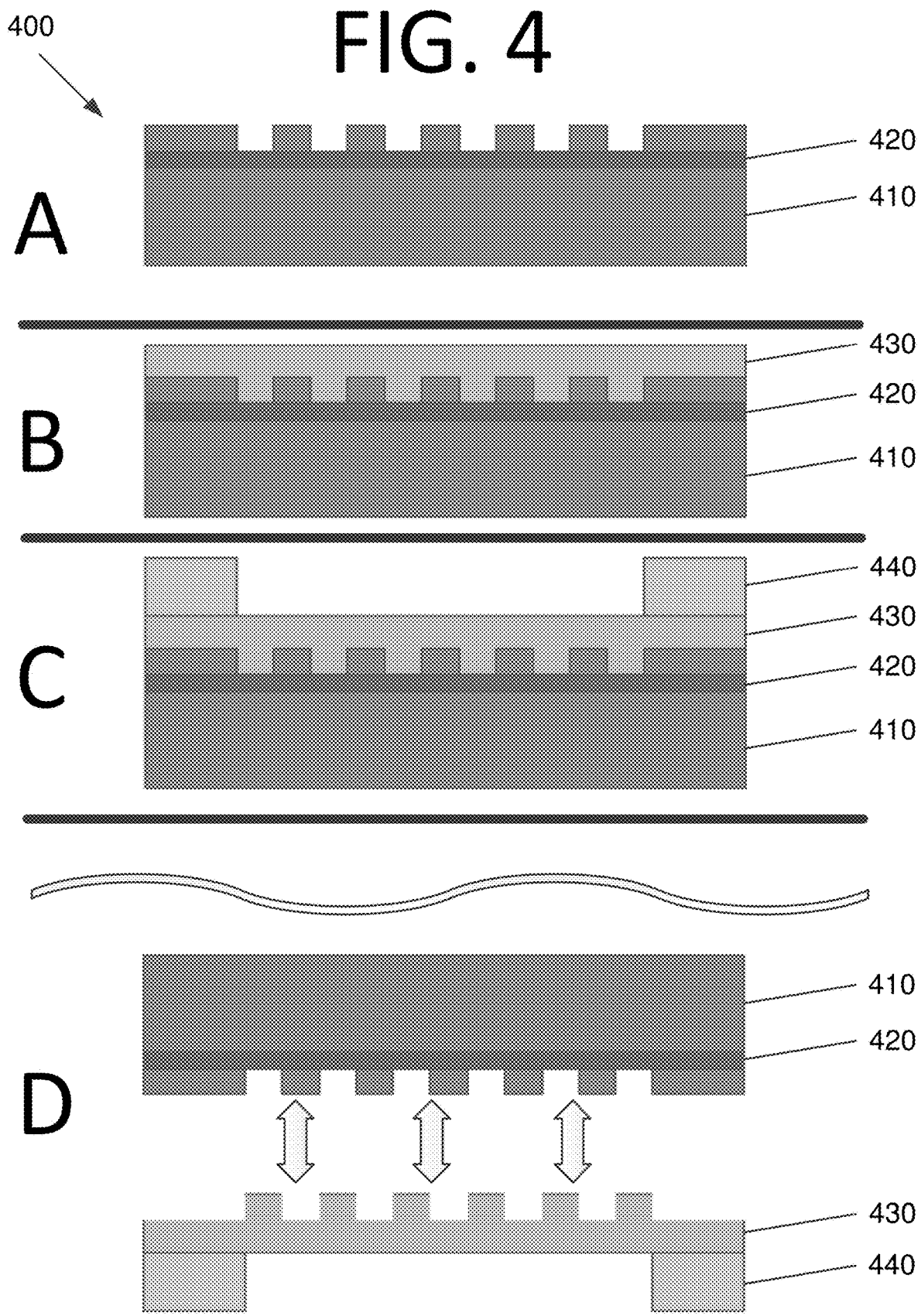
FIG. 4 illustrates another process for producing an ultra-thin structured polymer film, according to an embodiment of the present invention.

FIGS. 3-5 illustrate respective processes 300, 400, 500 for producing ultra-thin structured polymer films that each include etching a wafer (step A), spinning on a polymer film (step B), applying frame handles to the polymer film (step C), and placing the wafer and film in water to delaminate the film (step D). In process 300 of FIG. 3, polymer film 320 is spun onto an etched silicon wafer 310, frame handles 330 are applied to polymer film 320, and film 320 is separated from wafer 310 after delamination in water.

Process 400 is similar to that of FIG. 3, except that SOI wafer 410 includes a SOI layer 420. Polymer film 430 is then spun onto etched SOI wafer, frame handles 440 are applied, and polymer film 430 is separated from SOI wafer 410. Process 500 and SOI wafer 510, SOI layer 520, film 530, and frame handles 540 are identical to those of FIG. 4, except that slopes 512 are etched into SOI wafer 510.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of forming a photon sieve, the method comprising:
   spinning a thermoplastic polymer film onto an etched silicon wafer, the etched wafer serving as a mold for the thermoplastic polymer film;
   baking the thermoplastic polymer film on a hotplate at a curing temperature, the curing temperature adjusted to dry a solvent in the spun film and to cause the thermoplastic polymer film to flow on the etched wafer, fill areas of the wafer that were etched, and partially planarize a thickness of the thermoplastic polymer film;
   delaminating the thermoplastic polymer film from the wafer in water by allowing the water to penetrate between the wafer and polymer film; and
   peeling the thermoplastic polymer film from the etched wafer, thereby producing, as the photon sieve, a structured thermoplastic polymer film that has structures corresponding to the areas where the wafer has been etched.

2. The method of claim 1, wherein the etched wafer is a silicon-on-insulator (SOI) wafer.

3. The method of claim 1, wherein the etched wafer comprises sloped sidewalls.

4. The method of claim 1, wherein the thermoplastic polymer film comprises at least one cyclic olefin copolymer (COC).

5. The method of claim 1, wherein the curing temperature of the baking is less than 200° C.

6. The method of claim 1, further comprising:
reusing the etched wafer to produce another structured thermoplastic polymer film.

7. The method of claim 1, wherein the structured thermoplastic polymer film comprises a phase contrast photon sieve or a combination of a phase contrast photon sieve with one or more of an antireflection coating, an absorber, and an infrared blocking filter.

8. The method of claim 1, wherein the structured thermoplastic polymer film is coated with an absorbing layer comprising bismuth, black gold, carbon nanotubes, or any combination thereof.

9. The method of claim 1, wherein the wafer is etched to a depth of approximately 0.4 µm with at least one million circles.

10. A method of forming a photon sieve, the method comprising:
spinning a cyclic olefin copolymer (COC) film onto a silicon wafer that has been etched, the wafer serving as a mold for the COC film;
baking the COC film on a hotplate at a curing temperature, the curing temperature adjusted to dry a solvent in the spun film and to cause the COC film to flow on the wafer, fill etched areas of the wafer, and partially planarize a thickness of the COC film;
delaminating the COC film from the wafer in water by allowing the water to penetrate between the wafer and COC film;
peeling the COC film from the wafer, thereby producing, as the photon sieve, a structured COC film that has structures corresponding to the areas where the wafer has been etched; and
reusing the wafer to produce another structured COC film.

11. The method of claim 10, wherein the wafer is a silicon-on-insulator (SOI) wafer.

12. The method of claim 10, wherein the wafer comprises sloped sidewalls.

13. The method of claim 10, wherein the curing temperature of the baking is less than 200° C.

14. The method of claim 10, wherein the structured COC film comprises a phase contrast photon sieve or a combination of a phase contrast photon sieve with one or more of an antireflection coating, an absorber, and an infrared blocking filter.

15. The method of claim 10, wherein the structured COC film is coated with an absorbing layer comprising bismuth, black gold, carbon nanotubes, or any combination thereof.

16. The method of claim 10, wherein the wafer is etched to a depth of approximately 0.4 µm with at least one million circles.

17. A method of forming a photon sieve, the method comprising:
spinning a polymer film onto a silicon wafer that has been etched, the wafer serving as a mold for the polymer film;
baking the polymer film on a hotplate at a curing temperature, the curing temperature adjusted to dry a solvent in the spun film and cause the polymer film to flow on the wafer, fill areas of the wafer that were etched, and partially planarize a thickness of the polymer film; and
delaminating the polymer film from the wafer in water by allowing the water to penetrate between the wafer and polymer film, thereby producing a photon sieve that has structures corresponding to areas where the wafer was etched.

18. The method of claim 17, further comprising:
peeling the polymer film from the wafer, thereby producing, as the photon sieve, a structured polymer film that has structures corresponding to areas where the wafer was etched.

19. The method of claim 17, further comprising:
reusing the wafer to produce another structured polymer film.

20. The method of claim 17, wherein the polymer film comprises at least one cyclic olefin copolymer (COC).

* * * * *